United States Patent [19]
Bissey

[11] Patent Number: 5,996,865
[45] Date of Patent: Dec. 7, 1999

[54] HAND GUN CONTAINER ASSEMBLY

[76] Inventor: Dean C. Bissey, P.O. Box 1589, Delta Junction, Ak. 99737

[21] Appl. No.: 09/174,807

[22] Filed: Oct. 19, 1998

[51] Int. Cl.[6] ........................................................ B60R 7/00
[52] U.S. Cl. .......................... 224/275; 206/37; 224/42.32; 224/42.4; 224/912
[58] Field of Search .................................... 224/275, 912, 224/929, 42.32, 42.4, 556, 557, 566, 572, 273; 206/317

[56] References Cited

U.S. PATENT DOCUMENTS

| | | | |
|---|---|---|---|
| 5,282,598 | 2/1994 | Greene | 248/311.2 |
| 5,511,711 | 4/1996 | Kunz | 224/539 |
| 5,662,219 | 9/1997 | Tschudy et al. | 206/317 |

Primary Examiner—Allan N. Shoap
Assistant Examiner—Maerena W. Brevard
Attorney, Agent, or Firm—Clifford G. Frayne

[57] ABSTRACT

A container for securing a hand gun and ammunition in the passenger compartment of a vehicle, the container being foam lined and having preformed contour receptacles for accommodating a particular style of hand gun and ammunition associated therewith, the container having a securable lid and further having a hinged flap along a lower edge for insertion between the passenger seat and passenger seat back rest, the hinged flap having a securing means for attachment once so inserted, the container further having hook and loop fasteners secured to the underside for alternatively securing the container to the front passenger floor of the passenger compartment.

5 Claims, 4 Drawing Sheets

HAND GUN CONTAINER ASSEMBLY

BACKGROUND OF THE INVENTION

1. Field of the Invention

The present invention relates to a container for a hand gun and ammunition and more particular to a container which can be secured within the passenger compartment of a vehicle securing the handgun and ammunition.

2. Background of the Invention

The laws of the various states differ considerably with respect to the possession and carrying of hand guns. In many states it is illegal to carry a hand gun in public unless the individual is a law enforcement officer or has been properly licensed by the appropriate state authority. In many states it is illegal to carry a hand gun unless it is carried openly and overtly so that it can be viewed by other individuals. In still other states it is legal to carry a hand gun in public in a concealed location, such as a shoulder holster under a jacket or a belt holster overlaid by a jacket.

Still further the laws from state to state vary with respect to the carrying of hand guns or any weapons in a vehicle. Some states require all fire arms to be carried in an unloaded condition, and be locked in the trunk of the vehicle. Still other states allow an individual who is properly licensed to carry a hand gun to place the hand gun on the seat of the vehicle or in some other location in the passenger compartment of the vehicle as long as it is in plain sight. Many other states prohibit the carrying of a hand gun in the passenger compartment of the vehicle if the hand gun is positioned in a concealed position such as under the seat, etc.

Applicant's invention is directed to a container which is securable within the passenger compartment of a vehicle and for use by individuals who are properly licensed to carry a hand gun, be they law enforcement individuals or ordinary citizens, which permits the removal of the hand gun from the body holster and the positioning of the hand gun in the container in either a secured or unsecured position so as to provide for a more comfortable operation of the vehicle while at the same time providing the individual with rapid and easy access to the hand gun.

There are patented devices for carrying a hand gun on the individual person, these devices being in the form of pouches or fanny packs as evidenced by U.S. Pat. No. 5,505,355 to Williams and U.S. Pat. No. 5,294,031 to Volpei. Still further there are security assemblies which secure a hand gun in an open accessible position as disclosed by Rassias in U.S. Pat. Nos. 5,768,816 and 5,611,164. These security assemblies are particularly designed for mounting of the assembly on the dashboard of a police squad car.

Still further, there are assemblies for securing the hand gun and holster within a vehicle such as that disclosed by Serres in U.S. Pat. No. 4,256,245.

Applicant's invention offers an improvement and advantage over the prior art in that it can be mounted on the passenger seat of the vehicle or the front floor of the vehicle and allows for the easy removal and storage of the hand gun from the individual's holster yet permits easy access to the hand gun if need be.

Still further applicant's invention provides that the gun is in clear sight and not concealed when the individual is in the vehicle, yet permits the individual the option to secure the hand gun in a concealed position within the secured container when the individual leaves the vehicle and wishes to leave the hand gun within the vehicle.

OBJECTIONS OF THE INVENTION

An object of the present invention is to provide for a novel container which is securable within the passenger compartment of a vehicle for the accommodation of a hand gun and ammunition.

A still further object of the present invention is to provide for a novel container which is securable within the passenger compartment of a vehicle and in which the container is further securable to prevent removal of the hand gun or ammunition from the container.

A still further object of the present invention is to provide for a novel container for a hand gun and ammunition in which the hand gun is positioned within the container so as to prevent inadvertent injury passenger.

A still further object of the present invention is to provide for a container for a hand gun and ammunition for use in the passenger compartment of a vehicle wherein the container is fully compartmentalized to prevent any accidental discharge of the weapon from or as a result of the operation of the vehicle.

SUMMARY OF THE INVENTION

A container for securing a hand gun and ammunition in the passenger compartment of a vehicle, the container being foam lined and having preformed contour receptacles for accommodating a particular style of hand gun and ammunition associated therewith, the container having a securable lid and further having a hinged flap along a lower edge for insertion between the passenger seat and passenger seat back rest, the hinged flap having a securing means for attachment once so inserted, the container further having hook and loop fasteners secured to the underside for alternatively securing the container to the front passenger floor of the passenger compartment.

BRIEF DESCRIPTION OF THE DRAWINGS

These and other objects of the invention will become evident particularly when considered in light of the following illustrations wherein.

DETAILED DESCRIPTION OF THE DRAWINGS

Figure 1:
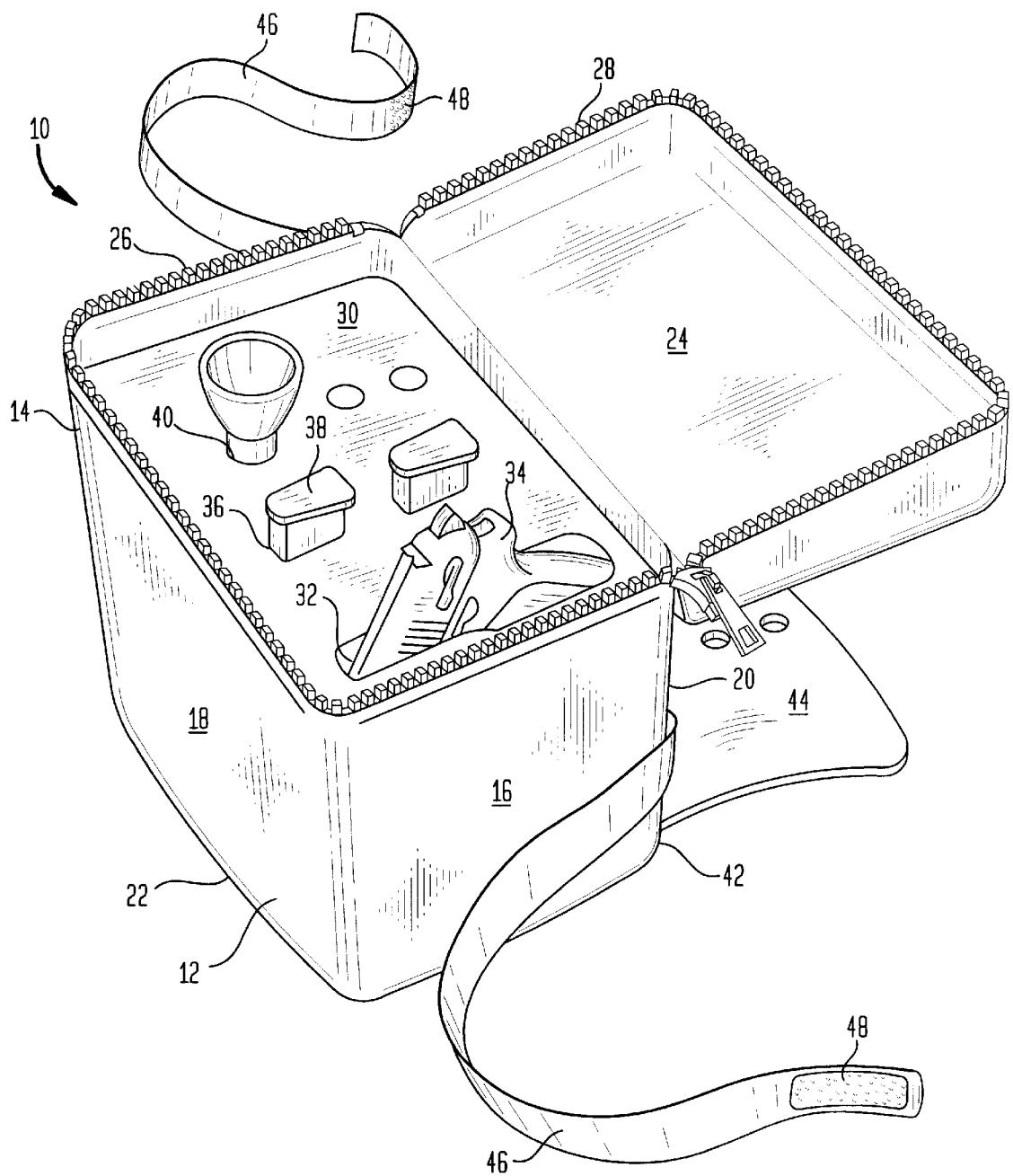
FIG. 1 is a prospective view of the container.

Referring to FIG. 1 there is illustrated a prospective view of the container 10 for a hand gun and ammunition. The container 10 comprises an outer casing 12 having opposing side walls 14 and 16, front wall 18, rear wall 20 and bottom wall 22. The outer casing can be made of rigid material such as thermoplastic or metal, or preferably, it is constructed of durable man made fiber such as nylon, kevlar, or the like. Container 10 has secured to the back wall 20, a hinged lid or top 24, which is securable about the periphery 26 of container 10 by means of a zipper 28. Zipper 28 may also include means for locking the zipper when lid 24 is in the closed position so as to prohibit unwanted entry into the container.

Container 10 houses a foam member 30, which is dimensioned to fit snugly within container 10. Foam member 30 has a plurality of receptacle indents formed therein. A first receptacle indent 32 is dimensioned to receive the barrel and handle portion of hand gun 34. It will be recognized that hand guns take on a variety of shapes and sizes and therefore receptacle 32 can be dimensioned to receive a variety of different makes and models of hand guns of a particular style, such as a clip fed semi-automatic hand gun, or in the alternative, receptacle indent 32 can be dimensioned to receive the revolver style hand gun. Still further, foam member 30 and receptacles 32 can be formed for a specific style of hand gun, such that while container 10 and the structure and function as described herein would be universal for all types of hand guns, the foam member 30, designed to fit within container 10, could be individualized for a particular hand gun. In addition to receptacle indent 32, there would be a plurality of receptacle indents 36 which would accommodate extra ammunition for the particular hand gun. In FIG. 1, there is illustrated the clips utilized for reloading of a semi-automatic hand gun, however, the receptacles could be shaped and dimensioned to accept speed loaders for revolvers.

Foam member 30 could also contain additional receptacle indents 40 for receipt of additional items such as a flashlight, can of mace, or the like.

There is hingeably secured to the lower edge 42 of back wall 20, a flap 44 which is rotatable from a secured or stowed position in contact with bottom wall 12, to an extended position as shown in FIG. 1, which allows it to be slipped between the seat and backrest of the passenger seat of the vehicle as described more fully hereafter.

Additionally, there may be secured to the back wall 20 of container 10, a strap means 46 which would extend from both sides of back wall 20 and which could be utilized to wrap around the passenger seat back rest to further secure container 10 in its position with the use of hook and loop fasteners 48 on the respective ends of straps 46.

Additionally, bottom wall 12 may have a plurality of hook and loop fasteners 39 (FIG. 3) positioned thereon. Hook and loop fasteners 39 would be utilized to secure container 10 in an alternative location within the vehicle, namely on the floor between the driver seat and passenger seat within the vehicle compartment.

Figure 2:
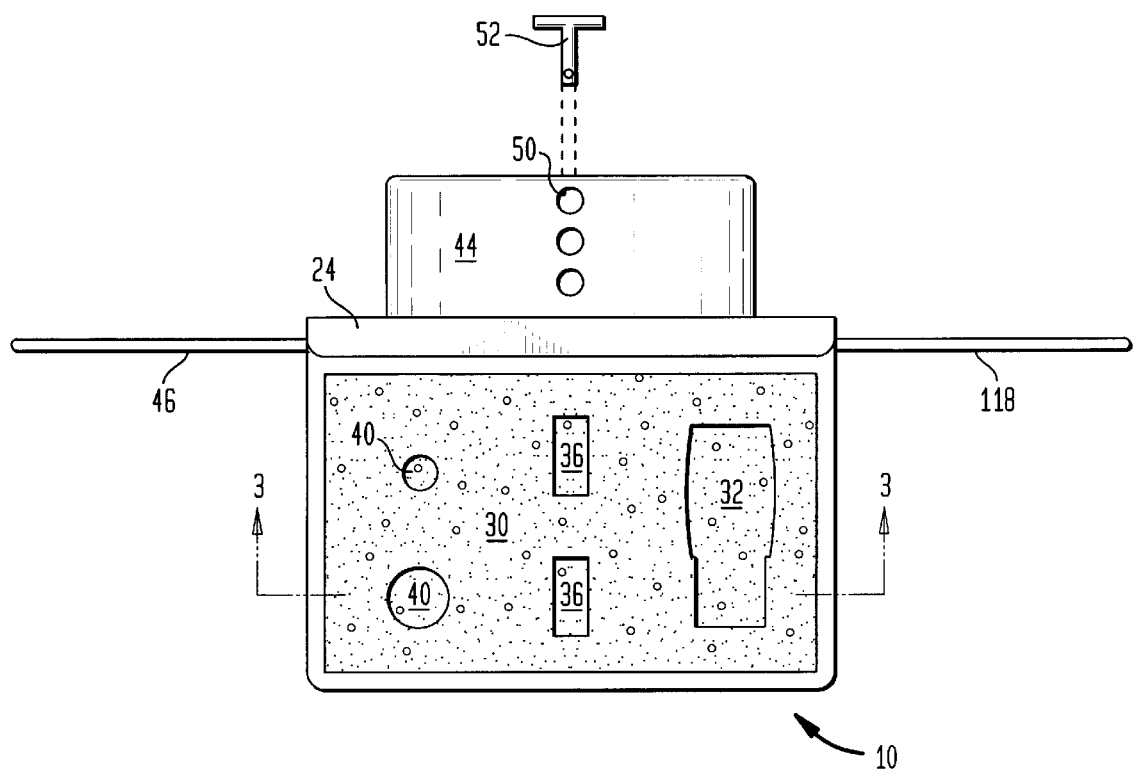
FIG. 2 is a top view of the container.
Figure 3:
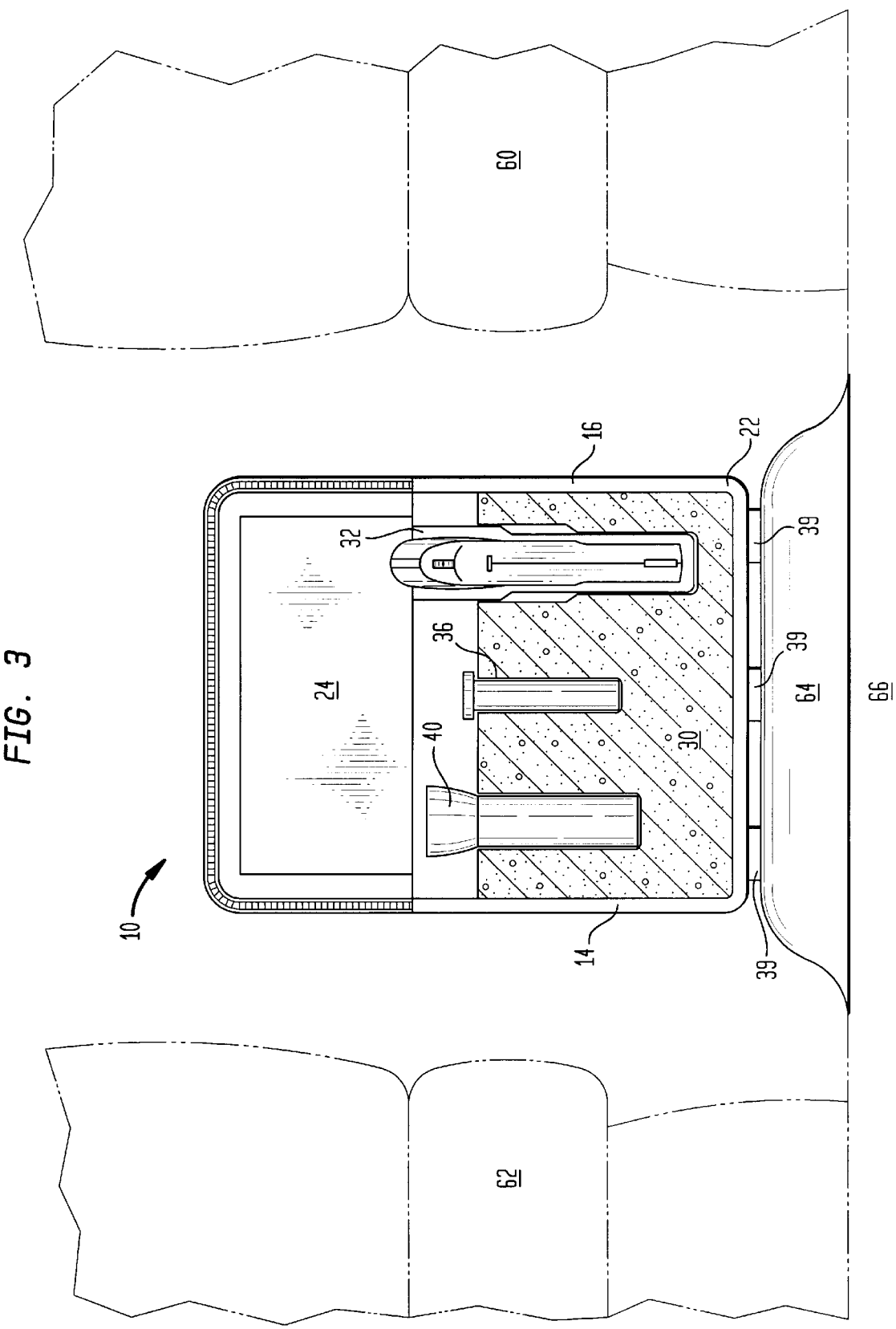
FIG. 3 is a front cross-section view of the container secured to the floor of the vehicle.
Figure 4:
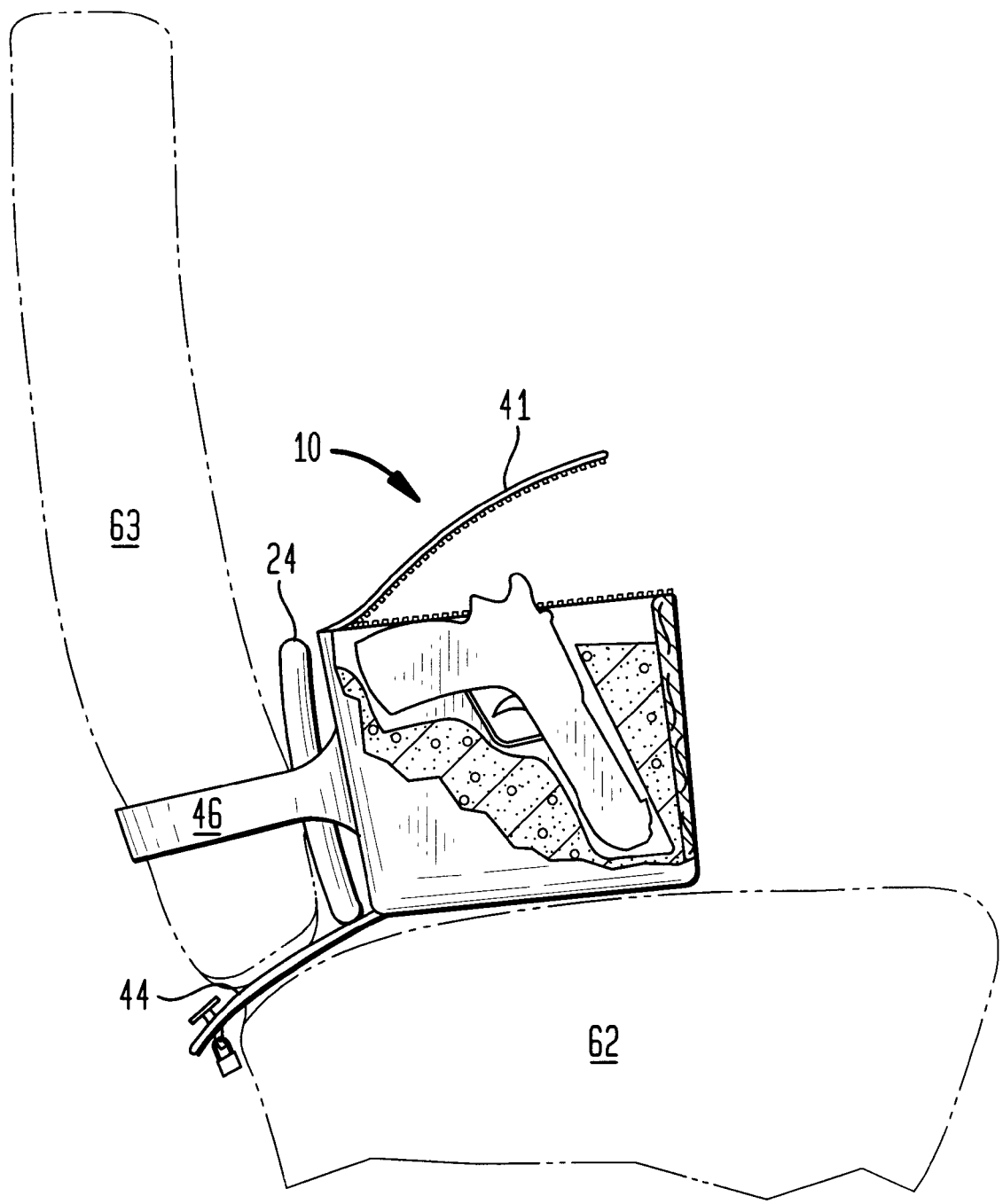
FIG. 4 is a side partial cross-section view of the container secured to the passenger seat of a vehicle.

The positioning of the container 10 in either of the foregoing locations and its cooperation with the vehicle seat will be more fully considered and described particularly when taken in light of FIGS. 2, 3 and 4.

FIG. 2 is a top view of container 10 with lid 24 in the open position and more clearly illustrates receptacle 32 for receipt of a hand gun, receptacle 36 for receipt of the ammunition clips 38 and ancillary receptacles 40. FIG. 2 further illustrates that flap 44 has a plurality of apertures 50 positioned therethrough and these apertures permit the positioning of a securing device therethrough once flap 44 has been inserted between the seat cushion and backrest cushion. The securing means could take the form of a pad lock, or a pad lock and bar inserted through one of apertures 50 such that the securing device does not permit the withdrawal or movement of container 10 from the passenger seat without first removing the securing means. It thus serves as an anti-theft device. One such securing means could consist of a T-bar 52 having an aperture therethrough for receipt of a padlock, such that the T-bar would be inserted through one of the apertures 50 and a padlock secured through the aperture in the T-bar.

Referring to FIG. 3, there is illustrated a cross-sectional view of container 10 along plane 3—3 of FIG. 2. As stated, foam insert 30 is dimensioned to fit snugly within container 10 and in the preferred mode, the receptacles would be dimensioned to conform to a particular style of hand gun and ammunition, but could be dimensioned to accommodate a variety of styles of hand gun and ammunition albeit not as snugly as would be preferred. It can be seen from FIG. 3, that receptical 32, 36 and 40 do not extend completely through foam member 30, but rather, provides a base portion so as to cushion the hand gun, ammunition and the like while the vehicle is moving.

FIG. 3 illustrates container 10 being positioned between the seats 60 and 62 of the vehicle passenger compartment. In this illustration, the container 10 is positioned on the transmission hump 64 of the vehicle, but could be positioned directly on the floor 66 of the vehicle if it was of rear wheel drive. The bottom 22 of container 10 has affixed thereto a plurality of hook and loop fasteners 39 which are used to secure container 10 and the contents to the transmission hump 64 or the floor 66.

FIG. 4 is a side view of passenger seat 62 with container 10 secured thereto in the preferred fashion. In this configuration, lid 24 is rotated rearwardly and positioned between the rear wall 20 of container 10 and back rest 63. Flap 44 is positioned through the gap between backrest 63 and seat 62 and a securing apparatus, preferably in the form of a T-bar 52, is positioned through one of the apertures 50 and secured possibly by a padlock. Strap means 46 extending from the rear wall 20 may then also be secured around back rest 63.

As an additional feature, when the container 10 is positioned in this manner, a cloth cover 41 secured along the upper longitudinal edge of rear surface 20 may be laid over the receptacles 32, 36 and 40, which would allow the individual to rapidly remove the weapon from the container if so desired.

While the present invention has been described with respect to the exemplary embodiments thereof, it will be recognized by those of ordinary skill in the art that many modifications and changes may be accomplished without departing from the spirit and scope of the invention. Therefore it is manifestly intended that the scope of the invention be limited only by the claims and the equivalence thereof.

I claim:

1. A hand gun container for vehicular use comprising:

an outer shell having a front wall, rear wall, opposing side walls, and bottom wall; and a lid hinged to the rear wall of said outer shell and securable about the upper perimeter of said front wall and opposing side wall; and a foam member dimensioned to be receivable within said outer shell, said foam member having a plurality of receptacles formed therein, at least one receptacle formed to receive the muzzle and breach portion of a hand gun, at least one receptacle dimensioned to receive the ammunition holder and ammunition for said hand gun; and a semi-rigid flap secured along the longitudinal edge formed by said rear wall and said bottom wall of said outer shell, said semi-rigid flap having a plurality of apertures therethrough, said longitudinal flap rotatable between a secured position with said bottom wall and an extended position extending between the seat cushion and seat back of a vehicle passenger seat, said flap having said plurality of apertures therethrough for receipt of a securing means.

2. The hand gun container in accordance with claim 1 wherein said bottom surface of said outer shell further has position thereon a hook and loop fastener for securing said container to the floor of said vehicle.

3. The hand gun container in accordance with claim 1 wherein said rear wall of said outer shell has secured thereto, a strap means extendable and securable about said seat back of said passenger seat of said vehicle.

4. The hand gun container in accordance with claim 1 wherein said foam member receptacles are dimensioned for the receipt of an automatic hand gun and ammunition therefore.

5. The hand gun container in accordance with claim 1 wherein said foam member receptacles are dimensioned for the receipt of a revolver hand gun and ammunition therefore.

* * * * *